United States Patent Office 3,140,110
Patented July 7, 1964

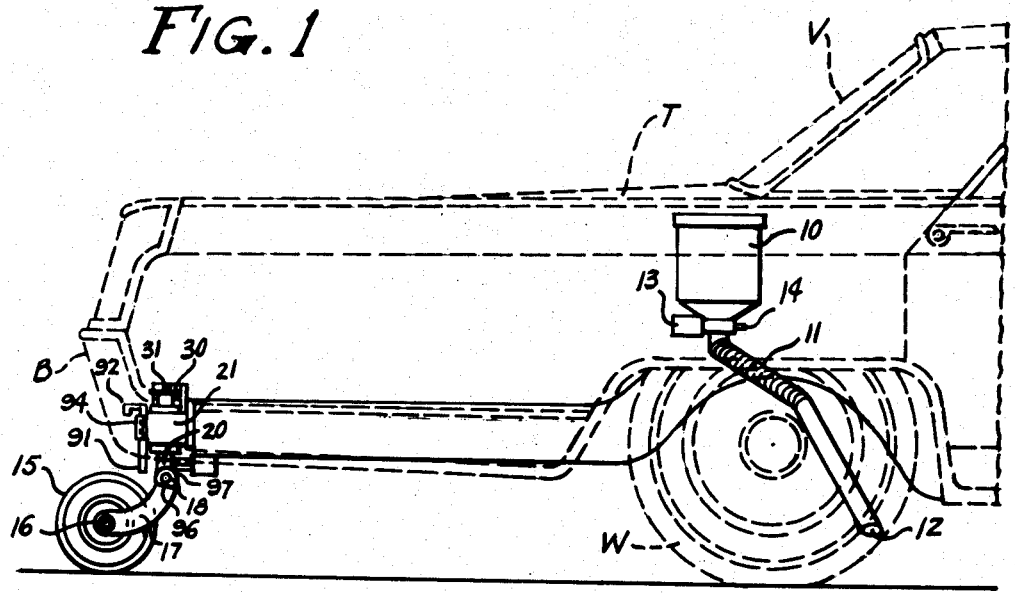

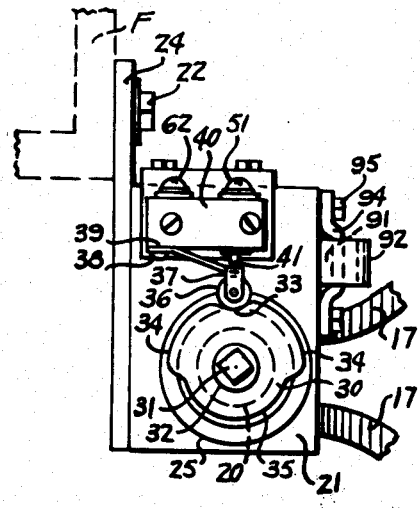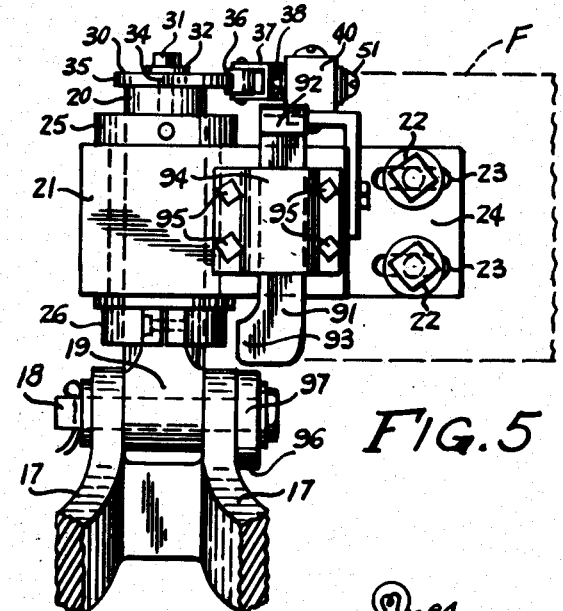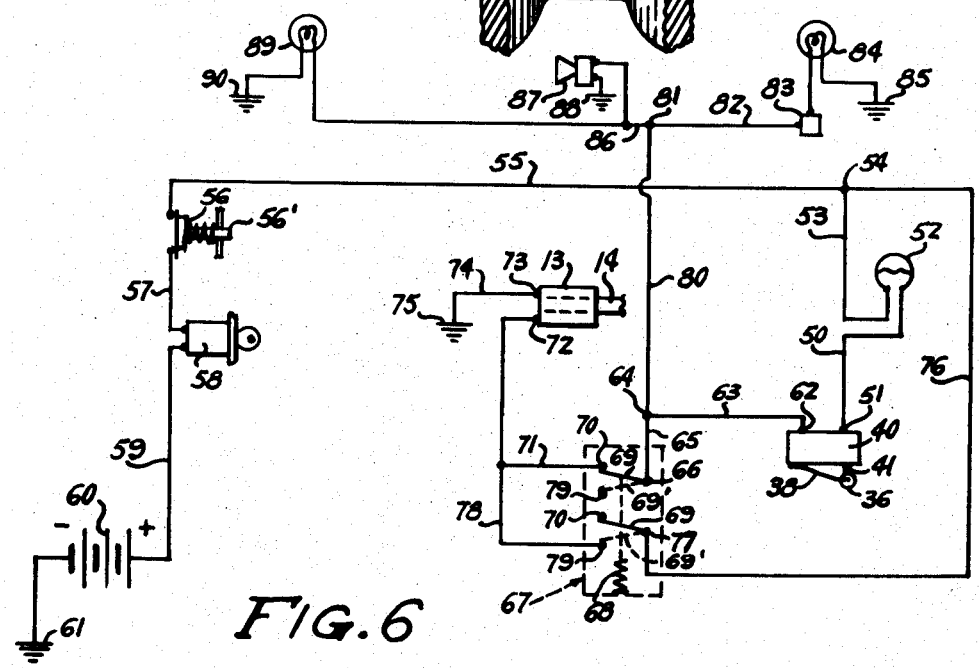

3,140,110
AUTOMATIC SANDING DEVICE FOR VEHICLES
Nacwill Wonner, Box 51, Wrightsville, Pa.
Filed Jan. 24, 1963, Ser. No. 253,718
6 Claims. (Cl. 291—2)

This invention relates to an automatic sanding device for vehicles such as automobiles, trucks, trailers or the like, and has as its primary object the provision of an improved device for applying sand to enhance the tractive effect of the rear or traction wheels automatically in the event of a skid under icy or other slippery conditions.

An additional object of the invention is the provision of a device of this character which is actuated by a trailing caster wheel so positioned that when turned by skidding of the traction wheels of the vehicle, automatic mechanism is immediately actuated releasing sand through guide pipes immediately adjacent each rear wheel, so that tractive surface is applied adjacent both wheels regardless of the direction of the skid.

A further object of the invention is the provision of this device which is entirely automatic in operation, which may be cut off when not desired by lifting and locking the caster wheel out of contact with the road, which will be inoperative under conditions of turn greater than a right angle, which may be cut out when the vehicle is backing, or which may be manually operated by a switch on the dashboard when it is desired to provide sand without a skidding of the vehicle.

A further object of the invention is the provision of a device of this character which is sturdy and durable in construction, reliable and efficient in operation, and relatively simple and inexpensive to manufacture, install and utilize.

Other objects reside in the combinations of elements, arrangements of parts, and features of construction, all as will be more fully pointed out hereinafter and disclosed in the accompanying drawings wherein there is shown a preferred embodiment of this inventive concept.

In the drawings:

FIGURE 1 is a side elevational view, parts thereof being omitted, showing the general positioning of apparatus in accordance with the instant invention in relation to the rear wheels of a vehicle, the latter being shown in dotted lines;

FIGURE 2 is a top plan view, on a reduced scale, of the mechanism of FIGURE 1, the vehicle frame being indicated in dotted lines;

FIGURE 3 is an enlarged side elevational view taken substantially along the line 3—3 of FIGURE 2 as viewed in the direction indicated by the arrows.

FIGURE 4 is an enlarged top plan view taken substantially along the line 4—4 of FIGURE 3 as viewed in the direction indicated by the arrows.

FIGURE 5 is an enlarged sectional view taken substantially along the line 5—5 of FIGURE 3 as viewed in the direction indicated by the arrows; and FIGURE 6 is a schematic wiring diagram showing the electrical association and circuitry of the device.

Similar reference characters refer to similar parts throughout the several views of the drawings.

Having reference now to the drawings in detail, the apparatus of the instant invention comprises a receptacle 10 containing sand or a similar tractive enhancing substance which is preferably contained in the trunk T of any desired type of vehicle V. From tank 10, which may be filled through a suitable opening in the top thereof, laterally and downwardly extending flexible tubes 11 lead to points immediately adjacent the forward position of each rear wheel W of the vehicle as shown at 12.

A solenoid coil of conventional design is contained in a housing 13 and actuates a normally closed slide valve 14 at the base of receptacle 10, in such manner that when the solenoid coil is energized, in a manner to be more fully described hereinafter, the valve is immediately opened, and sand passes through the tubes 11 to the points 12 immediately in front of and adjacent the inside of the traction wheels so that the sand applied will provide a forward traction and throw sand in the direction of the skid. By the positioning of the openings 12 interiorly of each wheel, sand is applied for increasing the tractive effect regardless of the direction of the skid.

Actuation of the solenoid 13 is effectuated by a caster wheel 15, which wheel is mounted on an axle 16 carried by a fork 17. Fork 17 is mounted on a horizontal journal 18 for up and down movement about a horizontal axis, to conform to the contour of the road. The pin 18, as best shown in FIGURE 5, extends through an enlarged boss 19, which comprises a portion of a vertically mounted shaft or axle 20 which is mounted for swivelling movement in a housing 21, the latter being bolted as by means of bolts 22 extending through slots 23 for adjustment purposes in flanges 24, the bolts being secured to a suitable rear portion of the frame member of the vehicle designated at F adjacent the rear end of the trunk, and preferably between the end of the frame and the bumper so as to protect the caster wheel 15.

Suitable bearing members 25 and 26 are positioned on opposite top and bottom sides of the housing 21 to provide for free swivelling of the shaft 20, the upper end of which carries a peripheral face cam, generally indicated at 30, which is secured fixedly to the upper end of shaft 20 by means including a clamping bolt 31 seating on a washer 32. As best shown in FIGURE 4, cam 30 includes a first small central low dwell portion 33 on opposite sides of which extending through an arc of approximately 90° are high dwell portions 34. The opposite side of the cam from 33 throughout an arc of approximately 180° is comprised of a second and longer low dwell 35. A cam follower wheel 36 is attached to the bifurcated ends 37 of a spring arm 38, the latter being attached by means of a bolt 39 to a fixed microswitch housing 40. The microswitch housing contains a conventional normally open microswitch which is actuated by a button 41 positioned immediately behind the cam follower wheel 36, so that when the cam follower wheel 36 encounters a high dwell 34 in the cam 30, switch button 41 is depressed to close the microswitch.

In the use and operation of the device, assuming that the caster wheel 15 is in contact with the road surface, and in track, as best shown in FIGURE 2, with one of the rear wheels, as the caster wheel swivels to the right or left as either of the wheels W enters a skid, the shaft 20 is turned, which in turn rotates the cam 30 so that one of the high dwells 34, in accordance with the direction of the skid, moves the cam follower wheel 36 into contact with the microswitch button 41, thus closing the switch. As illustrated in FIGURE 6, a wire 50 extends from one terminal 51 of microswitch housing 40 to a mercury switch 52 located on the fork 18 and operable to open the circuit, when the caster wheel 15 is held out of contact with the ground, for a purpose to be further described hereinafter. From mercury switch 52 a wire 53 leads to a terminal 54 from which a wire 55 leads to a normally closed spring biased switch member 56 which is associated with the gear shift lever 56' of the vehicle, and which is open when the vehicle is in reverse so that no sand is dropped. When the caster wheel has completely reversed its position, as it will do when the car is backing, the second low dwell 35 will preclude energization of solenoid core 13 through cam follower 36, even when switch 56 is closed, and the gear shift is in positions other than reverse. Thus no sand will be automatically dropped either when shift lever is in reverse or when the shift lever is not in reverse but the vehicle is moving backwards.

From reverse switch 56 a wire 57 leads through the ignition switch 58 to a wire 59 and thence to the battery 60 which is grounded as at 61.

An opposite terminal 62 on microswitch housing 40 is connected by means of a wire 63 with a terminal 64 from which a wire 65 leads to one terminal 66 of a spring-pressed, double-pole, double-throw toggle switch 67 preferably mounted on the dashboard of the vehicle V. The toggle (not shown) is normally biased by the spring 68 to maintain the levers 69 in contact with the terminals 70 within the switch 67. The upper terminal 70 is connected by a wire 71 to one terminal 72 of the solenoid 13. The other terminal 73 of solenoid 13 is connected to a wire 74 which leads to ground 75.

Another wire 76 is connected to the terminal 54 and by-passes the microswitch 40 to be connected to another terminal 77 within the switch 67 and in contact with the lower lever 69. A wire 78 is connected to terminal 79 within the switch 67 and electrically completes the circuit to the solenoid 13 when the toggle (not shown) is thrown to place the levers 69 in the dotted position 69'. The toggle switch has no center or "off" position but is normally maintained in the full line position shown by the levers 69 by the spring 68 so that when the microswitch 40 is closed by the cam 30 during a skid the solenoid 13 is energized and sand is distributed as explained above.

By throwing the switch 67 so that the levers 69 are in the dotted position 69', the vehicle operator may by-pass the microswitch 40 and provide sand at any desired time such as when he is driving up a steep hill or when the vehicle is moving backwards either under power or under its own momentum, or the like. As soon as he releases the toggle (not shown) the solenoid is automatically de-energized by the spring 68, unless the vehicle is skidding.

A single wire 80 may lead from the terminal 64 to a terminal 81 where a wire 82 can connect it through a blinker 83 to a red or amber light 84 grounded at 85 and secured to the front of the vehicle V for visual warning to other vehicle operators of the skid. Another wire 86 may extend to the horn 87, grounded as at 88 and to an indicator light 89 grounded at 90 and secured to the dashboard or the like for visual indication to the driver and audible indication to the driver and others of the skid.

It will be thus seen that when contact is established through one follower 36 with microswitch actuating button 41 and the switch is closed, a circuit will be established from the battery 60 through the ignition switch 58 to reverse switch 56 and the mercury switch 52 through the toggle switch 67 to solenoid 13, which will thus be energized actuating valve 14 immediately to release sand from receptacle 10, through tubes 11, and to the points 12 adjacent the tractive surfaces of wheel W, thus providing improved traction and stifling the skid or potential skid at its inception. Also the lights 84 and 89 will be energized and the horn 87 will be blown. Any other safety features can easily be included in the circuit. For example, the ignition switch may be automatically cut off by conventional electrical means if such a feature is desired when the microswitch 40 is closed at the beginning of a skid.

The device is extremely sensitive due to the positioning of the high dwells 34 of cam 30, in that any deviation of more than a few degrees will immediately and effectually close the microswitch 40 to actuate the solenoid 13 and open the valve 14. The larger the circumference of the cam 30, the more instant this operation will result.

Means are provided for holding caster wheel 15 out of contact with the ground, when such contact is undesirable. Such means take the form of a slide plate 91 having a handle portion 92 and a flat surface 93 mounted for slidable movement in a bracket 94 bolted as by means of bolts 95 to the side of housing 21. When slide plate 91 is moved downwardly, flat surface 93 engages a flat 96 on one side of a cam disc 97 which is mounted fast to fork 17 and concentric with horizontally disposed axle 19. The arrangement is thus such that engagement of surface 93 with flat 96 will hold caster wheel 15 in elevated position out of contact with road surfaces. When the device is in the elevated inoperative position, the mercury switch 52 opens the circuit, and thus the sanding device is inoperative when desired.

It is to be understood that this device is useful with self-operated vehicles such as automobiles, tractors and trucks and with pulled vehicles such as tractor-trailers or model home trailers or the like. In a conventional tractor-trailer, sand should be supplied adjacent the rear or traction wheels of the tractor as well as the rear wheels of the trailer to prevent jackknifing.

Also, it can be clearly seen that this device will be applicable to vehicles having a unitized body as well as a conventional frame and that certain modifications as to shape or design will be necessary depending on the construction of the particular vehicle.

From the foregoing it will now be seen that there is herein provided a device which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. In combination with a wheeled vehicle which includes a frame and a battery,
   an automatic anti-skid device comprising a sand tank provided with a discharge and mounted on said vehicle, tubes extending from said discharge of said tank to points adjacent each of said wheels,
   a normally closed solenoid actuated valve operable to open said discharge of said tank to admit sand to said tubes for distribution adjacent said wheels to increase traction,
   a ground contacting caster wheel depending from the rear of the frame of said vehicle and so positioned as to follow in the track of one of said wheels, thus being in a vertical longitudinal plane when the vehicle is traveling straight and forward,
   a vertical axle pivot mounting for said caster wheel permitting swiveling rotative movement, a peripheral face cam fixed to said axle so as to rotate therewith,
   a normally open switch stationarily mounted adjacent said cam and including a switch actuating button directed towards the axis of said vertical pivot, a spring arm with a portion overlying said button, a cam follower wheel carried by said spring arm and urged into contact with the periphery of said cam, the periphery of the cam including low dwell portions such that there is a clearance between said button and said overlying portion of said spring arm and the switch remains open, and other high dwell peripheral portions on said cam such that said button is depressed by said cam follower and overlying portion of the spring arm and said switch is closed,
   and a series electrical circuit connecting said battery, said switch and said solenoid of said valve,
   whereby upon swiveling rotation of said caster wheel during a vehicle skid,
   the switch will be operated by said cam, the circuit will be selectively opened and closed, and said solenoid valve will be controlled to discharge sand from the tank during high-dwell cam and follower positions, and to shut off sand from the tank during the low dwell cam and follower positions.
2. The structure of claim 1 wherein said peripheral face cam includes a low-dwell peripheral face portion with a midpart having the approximate curvature of said cam follower wheel, a high dwell portion at each side of said low dwell portion, and, on the opposite side of the cam from said low dwell portion, a second low dwell portion; the high dwell portions each extending through an arc of less than 90° and the second low dwell portion extending approximately one hundred eighty degrees (180°), said cam being so oriented with respect to said follower wheel that the latter contacts said first low dwell portion when said pivotally mounted caster wheel is trailing the vehicle and is in a vertical longitudinal plane.

3. The structure of claim 1 wherein said caster wheel is also journalled on a horizontal axle with outwardly extending ends, said journal being at the base of said vertical axle, fork means freely carried on the ends of the horizontal axle journal and mounting the trailing caster wheel, whereby the caster wheel is permitted to oscillate up and down about the horizontal axis to follow road contours, means at one end of said horizontal journal preventing its longitudinal movement with respect to the vertical axle mounting, a second cam disc freely carried about the other end of said horizontal journal, but made fast to said fork means to partake exactly of the motions of said fork, said latter disc means possessing a planar bottom edge surface which is approximately horizontal when the caster wheel contacts the ground, a slide plate fixed only for vertical movement and having a substantially vertical flat face which can contact the flat surface of the cam disc when the caster wheel is sufficiently elevated above the ground, to thus lock the wheel out of contact with the ground.

4. The structure of claim 3 wherein said series electric circuit also includes a positionally operable electric switch mounted upon said fork to partake of the fork motion about said horizontal axle, said latter switch being normally in an on position when the caster wheel contacts the ground, and in an off position when the caster wheel is lifted to a locked position out of contact with the ground.

5. The structure of claim 4 wherein said positionally operable switch is a mercury switch mounted adjacent that end of said fork means closer to the caster wheel.

6. The structure of claim 1 wherein said vehicle also includes a gear shift lever means shiftable to a reverse drive position, and said series electric circuit also includes a normally spring biased closed switch with operating means connected to the gear shift lever means, the operating means so arranged as to overcome the spring bias upon shifting the lever to a reverse drive position and to open said switch, to thereby open the circuit and stop the flow of sand.

References Cited in the file of this patent

UNITED STATES PATENTS

| | | |
|---|---|---|
| 857,774 | Turner | June 25, 1907 |
| 1,566,474 | Grim | Dec. 22, 1925 |
| 1,798,171 | Rosenthol | Mar. 31, 1931 |
| 2,768,013 | Hunt | Oct. 23, 1956 |
| 2,775,474 | Gendreau et al. | Dec. 25, 1956 |

FOREIGN PATENTS

| | | |
|---|---|---|
| 10,698 | Great Britain | May 7, 1906 |
| 28,518 | Great Britain | Dec. 14, 1906 |
| 27,655 | Great Britain | Dec. 14, 1907 |
| 28,787 | Great Britain | Dec. 14, 1912 |
| 467,585 | Great Britain | June 21, 1937 |